3,388,150
FLUOROKETONE HEMIKETAL ESTERS
Peter E. Newallis, Morris Plains, Roger L. Pierpont, Westfield, and Edmund J. Rumanowski, Dover, N.J., assignors to Allied Chemical Corporation, New York, N.Y., a corporation of New York
No Drawing. Filed Aug. 27, 1964, Ser. No. 392,618
7 Claims. (Cl. 260—476)

ABSTRACT OF THE DISCLOSURE

Fluoroketone hemiketal esters, useful as herbicides, having the following formula:

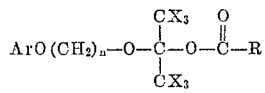

in which Ar is a member selected from the group consisting of phenyl, halogen substituted phenyl, lower alkyl substituted phenyl and halogen substituted lower alkyl substituted phenyl, $n$ is an integer of 1 to 3, X is a member selected from the group consisting of Cl and F and R is a member selected from the group consisting of lower alkyl, halogen substituted lower alkyl, phenyl, halogen substituted phenyl, lower alkyl substituted phenyl and halogen substituted lower alkyl substituted phenyl.

---

This invention relates to new and more effective herbicides. More particularly, this invention relates to new fluoroketone hemiketal esters of excellent herbicidal activity and methods of producing them.

It has been found that the novel herbicidal compounds of this invention exhibit more effective growth regulatory activity than many of the known herbicides. It is therefore the primary object of this invention to produce novel and new herbicidal compounds of increased regulatory activity. Another object of this invention is to provide a method of producing these novel herbicidal compounds. Another object of this invention is to produce a composition of matter which possesses increased herbicidal activity. Another object of this invention is to produce a herbicide of increased regulatory activity by reacting hemiketals with carboxylic acid chlorides, the production of the hemiketals being fully described hereinafter. These and other objects will become apparent in the following detailed description.

The fluoroketone hemiketal esters of this invention are produced by reacting fluoroketone hemiketals with carboxylic acid chlorides in the presence of an inert solvent containing a hydrogen halide acceptor. More specifically, a fluoroketone hemiketal of the general formula

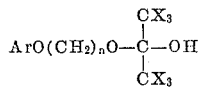

in which Ar is selected from the group consisting of phenyl, halogen substituted phenyl, lower alkyl of up to 5 carbon atoms substituted phenyl and halogen substituted lower alkyl of up to 5 carbon atoms substituted phenyl, $n$ is an interger of 1 to 3 and X is selected from the group consisting of Cl and F, is reacted with a carboxylic acid chloride of the general formula

in which R is selected from the group consisting of lower alkyl of up to 5 carbon atoms, halogen substituted lower alkyl of up to 5 carbon atoms, phenyl, halogen substituted phenyl, lower alkyl of up to 5 carbon atoms substituted phenyl and halogen substituted lower alkyl of up to 5 carbon atoms substituted phenyl, in the presence of an inert solvent containing a hydrogen halide acceptor.

The fluoroketone hemiketal esters are defined by the following general formula:

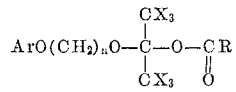

in which the Ar, X and R substituents are defined hereinabove as in the general formulas of the two original reactants.

In the preferred operation, a solution of the fluoroketone hemiketal and the carboxylic acid chloride in an inert solvent, for example, isopropyl ether, is added dropwise to a solution of the hydrogen halide acceptor in an inert solvent, for example, isopropyl ether. The hydrogen halide acceptors are, for example, sodium carbonate, triethyl amine, pyridine, etc. Other solvents for the reactants and hydrogen halide acceptor may be used, for example, any inert solvent such as ethyl ether. The dropwise addition is carried out at room temperature, preferably with vigorous agitation, over a period of about 15 minutes. During this time there is some increase in temperature. The reaction mass is then stirred for about 30 minutes at a temperature of about 40° C. to 55° C. and then cooled to room temperature. The relative amounts of the fluoroketone hemiketal, carboxylic acid chloride and hydrogen halide acceptor may vary from about 0.5 mol to 1.0 mol.

The reaction mass, after cooling to room temperature, is filtered to remove salt by-product and the solvent distilled under reduced pressure. The resulting oil, which is the desired compound of this invention, is then allowed to stand at room temperature which results in solidification. This solid, ground up with cold hexane and then filtered, generally results in a white solid.

The hemiketal starting product of this invention is prepared by reacting a phenoxy alcohol with a perhaloketone, in which at least two of the halogens are fluorine, in an inert solvent. For example, 21 grams of hexafluoroacetone is added to 20.7 grams of 2,4-dichlorophenoxyethanol dissolved in 100 ml. of tetrahydrofuran in a three-neck flask equipped with a gas inlet, stirrer, thermometer and condenser and maintained at a temperature of 25° C. to 40° C. for 12 minutes. The mixture is stirred for 15 minutes as it cools from 40° C. to 30° C. The solvent, tetrahydrofuran, is removed in vacuo and the resulting reaction mass is dried. The mass contains the following hemiketal:

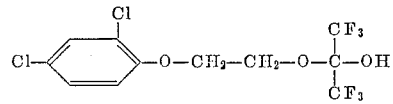

which has a melting point of 92°–94° C., theoretical carbon 35.4 percent, found, 35.3 percent; theoretical hydrogen 2.14 percent, found 2.19 percent.

The following examples illustrate the invention but are not to be construed as limiting it in any manner whatsoever.

Example 1

In a three-neck flask with stirrer, thermometer, condenser and addition funnel, containing a solution of 33.6 grams of hexafluoroacetone - 2,4-dichlorophenoxyethanol hemiketal and 15.9 grams beta beta dichloropropionyl acid chloride in 200 ml. of isopropyl ether was added dropwise a solution of 9.9 grams of triethyl amine in 50 ml. of isopropyl ether over a period of 15 minutes at a temperature of 50° C. to 55° C. with stirring and the mixture was then heated at 50° C. to 55° C. for 30 minutes. The reaction mass was then cooled and filtered, removing the salt by-product, and the solvent, isopropyl ether, was removed in vacuo. Forty grams of oil resulted which were placed in a freezer for 4 days. After standing at room temperature for 1 day, the slurry was filtered which gave 2.5 grams of solids. The solid was slurried with hexane, filtered and dried. This gave a herbicidal compound, 2-(2,4-dichlorophenoxyethoxy)-1,1,1,3,3,3-hexafluoropropyl beta beta dichloropropionate, M.P. 40° C.–41.5° C., percent carbon theoretical, 33.7 percent, found 33.4 percent; percent hydrogen theoretical, 2.0 percent, found 2.0 percent.

Example 2

In the same apparatus as in Example 1 was placed a solution of 11.2 grams hexafluoroacetone-2,4-dichlorophenoxyethanol hemiketal, 4.5 grams chloroacetyl chloride and 40 ml. isopropyl ether, to which was added dropwise over a period of 5 minutes a solution of 4 grams of triethyl amine and 10 ml. of isopropyl ether. The temperature increased from room temperature to 50° C. This reaction mass was stirred for 30 minutes at a temperature of 40° C. to 45° C., filtered to remove the salt by-product, and the solvent, isopropyl ether, was removed by vacuum distillation. Thirteen grams of oil were obtained which solidified upon standing at room temperature. The herbicidal compound was slurried with hexane, filtered and dried. This gave 8.5 grams of 2-(2,4-dichlorophenoxyethoxy)-1,1,1,3,3,3-hexafluoropropyl chloroacetate, M.P. 49°–51° C., percent carbon theoretical 34.7 percent, found 35.1 percent; percent hydrogen theoretical, 2.00 percent, found 2.36 percent.

Example 3

In the same apparatus as in Example 1 was placed a solution of 11.2 grams hexafluoroacetone-2,4-dichlorophenoxyethanol hemiketal, 4.8 grams of dichloroacetyl chloride and 75 ml. of isopropyl ether, to which was added dropwise over a period of 10 minutes a solution of 3.3 grams of triethyl amine and 25 ml. of isopropyl ether. The temperature increased from room temperature to 40° C. This reaction mass was stirred for 30 minutes at 40°–45° C., filtered to remove the salt by-product, the solvent, isopropyl ether, removed by vacuum distillation, and 13 grams of oil were obtained which solidified upon standing at room temperature. The herbicidal compound was slurried with hexane, filtered and dried. This gave 11 grams of 2 - (2,4 - dichlorophenoxyethoxy) - 1,1,1,3,3,3 - hexafluoropropyl dichloroacetate, M.P. 49°–52° C., percent carbon theoretical, 32.2 percent, found 31.6 percent; percent hydrogen theoretical, 1.65 percent, found 2.03 percent.

Example 4

In the same apparatus as in Example 1 was placed a solution of 11.2 grams of hexafluoroacetone-2,4-dichlorophenoxyethanol hemiketal, 6.0 grams of trichloroacetyl chloride and 75 ml. of isopropyl ether, to which was added dropwise over a period of 7 minutes a solution of 3.3 grams of triethyl amine and 25 ml. of isopropyl ether. The temperature increased from room temperature to 45° C. This reaction mass was stirred for 30 minutes at 40°–45° C., filtered to remove the salt by-product, the solvent, isopropyl ether, removed by vacuum distillation, and 14 grams of oil were obtained which solidified upon standing at room temperature. The herbicidal compound was slurried with hexane, filtered and dried. This gave 9.5 grams of 2 - (2,4 - dichlorophenoxyethoxy) - 1,1,1,3,3,3 - hexafluoropropyl trichloroacetate, M.P. 53°–56° C.

Example 5

In the same apparatus as in Example 1 was placed a solution of 11.2 grams of hexafluoroacetone-2,4-dichlorophenoxyethanol hemiketal, 6.9 grams of 2,4-dichlorobenzoyl chloride and 100 ml. of isopropyl ether, to which was added dropwise over a period of 10 minutes a solution of 3.3 grams of triethyl amine and 25 ml. of isopropyl ether. The temperature increased from room temperature to 40°–45° C. This reaction mass was stirred for one hour at a temperature of 40°–45° C., filtered to remove the salt by-product, and the solvent, isopropyl ether, removed by vacuum distillation, leaving a solid. The herbicidal compound was slurried with hexane, filtered and dried. This gave 8 grams of 2-(2,4-dichlorophenoxyethoxy)-1,1,1,3,3,3-hexafluoropropyl - 2,4 - dichlorobenzoate, M.P. 69°–72° C., percent of carbon theoretical, 39.6 percent, found 40.2 percent; percent of hydrogen theoretical, 1.83 percent, found 2.40 percent.

Example 6

In the same apparatus as in Example 1 was placed a solution of 12.2 grams of tetrafluoroacetone-2,4-dichlorophenoxyethanol hemiketal, 5.3 grams of beta beta dichloropropionyl acid chloride and 75 ml. of isopropyl ether, to which was added dropwise over a period of 5 minutes a solution of 3.3 grams of triethyl amine and 10 ml. isopropyl ether. The temperature increased from room temperature to 40° C. This reaction mass was then heated for 20 minutes at 35°–40° C., water was added and the salt layer was separated, washed the organic layer with NaOH solution, dried, the solvent, isopropyl ether, distilled and 10.5 grams of 2-(2,4-dichlorophenoxyethoxy)-1,1,3,3-tetrafluoro-1,3-dichloropropyl beta beta dichloropropionate, were obtained, after remaining in a hood for 48 hours at room temperature. This herbicidal compound was dissolved in 10–20 ml. of methanol, chilled in Dry Ice and dried, M.P. 45°–48° C., theoretical fluorine, 14.3 percent, found 14.0 percent; theoretical hydrogen 1.9 percent, found 2.0 percent.

As indicated above, the esters of this invention are useful as herbicides in combatting undesired vegetation. These compounds control the broad leaf or dicotyledonous varieties of plants such as smartweed, rape, lamb's-quarters, bindweed, horse nettle and Canada thistle most effectively.

These esters may be applied directly to the vegetation to be treated. However, for reasons of economy and to achieve greater uniformity of application, it is preferred to incorporate the active ingredient in a major amount of liquid or solid diluents. Outstanding results may be attained by employing as the diluent liquids in which the herbicide is soluble or dispersible.

The liquid diluent may be a solvent for the active ingredient or the active ingredients may be dispersed in the liquid diluent. Hence the esters can be conveniently formulated as a water-dispersible powder or as emulsifiable concentrates and dilute solutions in the organic hydrocarbon solvents. Typical organic hydrocarbons include fuel oils, petroleum naphthas, etc. The solutions or dispersions should contain the active ingredient in an amount not less than ½ of a pound per 100 gallons of dispersion or solution, the most usual concentration being in the range of 1 to 10 pounds per 100 gallons of dispersion or solution.

As indicated above, the active ingredient may be impregnated on a suitable solid diluent. Typical diluents, which may be a finely divided or granular form, include diatomaceous earth clays, wood flours and silica gels. The dusts may contain as little as around about 0.5 percent by weight of active ingredient.

Various conventional wetting, dispersing and emulsifying agents may be added to the herbicidal formulations of the type described in order to enhance the wetting effect and produce improved distribution of the active ingredient on the vegetation to which it is applied.

Any of the known types of spraying or dusting apparatus may be employed for applying the herbicide to the vegetation to be treated, a primary consideration being uniformity of application.

The herbicides of the present invention are applied to the area to be treated in amounts (pounds per acre) sufficient to afford the degree of control of vegetation desired in the given area. The optimum intensity of application of the desired herbicide will depend on such factors as amount of vegetation in the area, degree of permanency of plant eradication desired, type of plants growing in the area and climatic conditions. Hence as is well known to those skilled in the art, the rate of application actually used will depend largely on prevailing local conditions. In most instances, effective control of germinating weed seeds and small weed seedlings may be realized by applying the herbicide at an overall rate greater than around about ½ pound per acre. Where prolonged non-selective control on established vegetation is desired, dosages greater than about four pounds per acre are employed.

Test plots in a conventional Greenhouse Initial Screening Test series were prepared using seeds of monocotyledonous and dicotyledonous weed plants and seeds of monocotyledonous and dicotyledonous crop plants. These include rye grass and rape as weed plants and crop plants such as wheat, field corn, soybeans and cotton.

The following example is illustrative of the herbicidal activity of the compounds of the present invention.

Test plots were seeded with monocotyledonous and dicotyledonous weed plants, as well as with monocotyledonous and dicotyledonous crop plants. These plants included: monocotyledonous weeds, rye grass; monocotyledonous crops, wheat, corn; dicotyledonous weeds, rape; dicotyledonous crops, soybeans, cotton.

These formulations comprising the product of Example 4 in amounts of 4, 8 and 16 pounds respectively, each dissolved in 80 gallons of acetone were applied to 3 similar test plots at the rate of 80 gallons of solution per acre within one day of seeding. A check test plot was treated with acetone applied at the rate of 80 gallons per acre and another check test plot remained untreated. The treated test plots, in a greenhouse, were watered by sub-irrigation and after a 13-day observation period they were rated using two indices, injury rating (IR) and percent mortality (PK). The injury rating index is based on a scale of 0 to 10, 0 meaning no apparent injury; 1, 2 or 3, slight injury; 4, 5 or 6, moderate injury; 7, 8 or 9, severe injury, plants will die; and 10, all plants dead. The percent mortality is obtained by counting the number of plants in treated plots and expressing the result as a percent mortality when compared to the untreated plot. The following data were obtained:

|  | Application Rate, Pounds per Acre | | | | |
|---|---|---|---|---|---|
|  | 4 | 8 | 16 | Acetone | Blank |
| Corn: | | | | | |
| IR | 0 | 0 | 0 | 0 | 0 |
| Percent PK | 0 | 0 | 0 | 0 | 0 |
| Cotton: | | | | | |
| IR | 0 | 0 | 0 | 0 | 0 |
| Percent PK | 0 | 0 | 0 | 0 | 0 |
| Wheat: | | | | | |
| IR | 0 | 1 | 0 | 0 | 0 |
| Percent PK | 0 | 11 | 0 | 0 | 0 |
| Soybeans: | | | | | |
| IR | 0 | 1 | 1 | 0 | 0 |
| Percent PK | 0 | 0 | 0 | 0 | 0 |
| Rye grass: | | | | | |
| IR | 0 | 3 | 4 | 0 | 0 |
| Percent PK | 0 | 25 | 35 | 0 | 0 |
| Rape: | | | | | |
| IR | 9 | 9 | 9 | 0 | 0 |
| Percent PK | 85 | 93 | 99 | 0 | 0 |

The above results demonstrate that the ester of Example 4, a compound typical of those embraced by the present invention, is active as a pre-emergence herbicide on both dicotyledonous and monocotyledonous plants. In addition, the various concentrations of the ester of Example 4 gave only slight injury to wheat and soybeans. Thus the compounds of this invention can be employed as selective pre-emergence herbicides.

Post-emergence tests were carried out using the formulations described above applied at the rate of 2, 4, 8 and 16 pounds per acre on test plots 8 to 10 days after seeding. After an observation period of 12 days, the test plots were given an injury rating as shown below.

|  | Application Rate, Pounds per Acre | | | | | |
|---|---|---|---|---|---|---|
|  | 2 | 4 | 8 | 16 | Acetone | Blank |
| Corn | 0 | 0 | 0 | 2 | 0 | 0 |
| Rape | 8 | 9 | 10 | 10 | 0 | 0 |

While in the foregoing specification there have been set forth specific embodiments of this invention for purpose of illustration, it will be apparent to those skilled in the art that many of the specific embodiments and details thereof can be varied widely without departing from the spirit and scope of this invention.

We claim:
1. A fluoroketone hemiketal ester of the general formula:

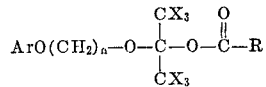

in which Ar is a member selected from the group consisting of halogen substituted phenyl, and halogen substituted lower alkyl substituted phenyl, $n$ is an integer of 1 to 3, X is a member selected from the group consisting of Cl and F and R is a member selected from the group consisting halogen substituted lower alkyl, halogen substituted phenyl, and halogen substituted lower alkyl substituted phenyl.

2. The ester having the following formula:

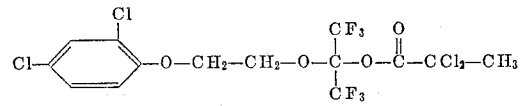

3. The ester having the following formula:

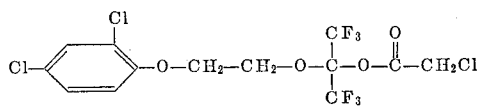

4. The ester having the following formula:

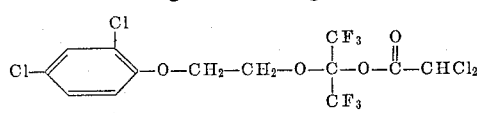

5. The ester having the following formula:

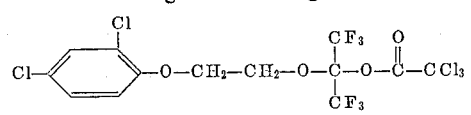

6. The ester having the following formula:

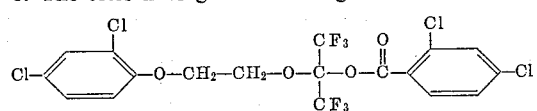

7. The ester having the following formula:

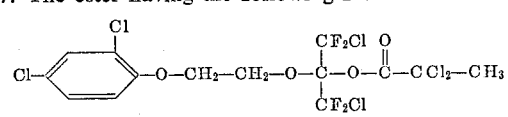

References Cited

Migrdichian, Organic Synthesis, vol. I, Reinhold, N.Y. 1960, pp. 319–320, QD 262 M55.

LORRAINE A. WEINBERGER, *Primary Examiner.*

T. L. GALLOWAY, *Assistant Examiner.*